Patented Aug. 29, 1944

2,357,100

UNITED STATES PATENT OFFICE 2,357,100

TRANSPARENT SHEET MATERIAL AND METHOD OF MAKING SAME

Erich Gebauer-Fuelnegg, Evanston, Ill., and Louis K. Eilers and Eugene W. Moffett, Gary, Ind., assignors, by mesne assignments, to Marbon Corporation, a corporation of Delaware No Drawing. Application April 14, 1933, Serial No. 666,222

8 Claims. (Cl. 117—145)

This invention relates to the production of a coated sheet material and to a process for producing the same.

We have found that a resin which is the reaction product of rubber with an amphoteric metal halide can be used to provide a very superior coating material for flexible and transparent sheet materials such as are commonly used for wrapping purposes. Two forms of this resin now on the market are known as "Pliolite" and "Plioform." These resins may be produced by dissolving crude rubber, either milled or unmilled, in a suitable solvent, such as benzene to form a rubber cement. HCl is passed into the solution and an amphoteric metal halide is then added to the resulting solution. Tin tetrachloride is preferably used. A reaction takes place which manifests itself in a drop in the viscosity of the solution. When the viscosity has reached a predetermined point, the reaction may be interrupted and an end product may be precipitated therefrom by means of alcohol or acetone. Preferably, however, the end product is isolated from the reaction mass by steam distillation. Resin having slightly different characteristics may be produced depending upon the point at which the reaction is interrupted. The name "Pliolite" refers to a resin produced by stopping the reaction at one point in the viscosity curve and the name "Plioform" refers to a resin suitable for use as a molding compound that is produced by stopping the reaction at another point on the viscosity curve.

A thin coating of a composition containing these resins will give not only waterproof characteristics to the base film but will also render the film heat sealable and will reduce the vapor transmission through the resulting coated sheet. The resulting sheet, furthermore, is non-tacky at ordinary atmospheric temperatures and conditions.

The coating composition of this invention can be applied to sheet materials made of cellulose, cellulose derivatives, proteins or materials derived from proteins or gelatine. We have found that a casein sheet material hardened with formaldehyde is particularly valuable for this purpose. A disclosure of a method for making a casein-formaldehyde sheet material will be found in the copending application, Serial No. 630,406 of Edouard M. Kratz and Herman Heckel.

In addition to the advantages mentioned above, the reaction products of rubber with amphoteric metal halides can be dissolved readily in low boiling solvents and the resulting solution will show no tendency to crystallize or blush on drying. This property renders these materials particularly adapted to high speed production where rapid drying and non-blushing properties are essential.

It is, then, an object of this invention to provide a waterproof, transparent, and heat-sealing sheet material having a very low rate of vapor transmission.

It is also an object of this invention to provide a process for the manufacture of such sheet material.

It is an additional object of this invention to provide a suitable coating composition for use in preparing such sheet material.

Other and further objects of this invention will be apparent from the following specification and claims:

A reaction product of ruber with an amphoteric metal halide which we prefer to use is commercially known under the trade name "Pliolite" and is an end product, probably a cyclo rubber, obtainable by reacting rubber with stannic chloride to form an addition product. The stannic chloride is then split off from the addition product to form a polymerized end product.

Specifically this polymerized end product may be prepared by boiling a solution of unvulcanized rubber, such as pale crepe rubber, in benzene, say of about 12% concentration, for two hours. Hydrochloric acid in an amount equivalent to about 2.8% by weight, based on the rubber, is added and the temperature is reduced to about 175° F. An amount of anhydrous stannic chloride equivalent to about 7% by weight, based on the rubber is added and the solution is thoroughly mixed at 175° F. until the viscosity is 0.30 minutes (Gardner mobilometer) at 25° C. The reaction is then stopped by the addition of water and the resulting mass is filtered. The solvent is then removed from the mass by steam distillation and the residual solids are centrifuged, dried and milled. The resulting polymerized end product known as "Pliolite" is directly suitable for use in the preparation of the coating solutions and compositions hereinafter described.

The coating composition may be produced by dissolving a suitable amount of the reaction product of rubber with an amphoteric metal halide described above in benzol, toluene, naphtha or other suitable organic solvents or mixtures of solvents and applying the resulting solution to the sheet material to be treated. The most suitable solvent for this purpose will be determined by its boiling range, which, in turn is determined by the type of coating machine, the speed at which it is to be run and the number of seconds which this speed allows for the drying of the coated sheet material.

When the coating machine is constructed to permit a long drying period, a comparatively high boiling solvent may be used but when only a short drying period is permitted a low boiling solvent will be required in order that the sheet may become sufficiently dry to be non-tacky in the time allowed for drying period.

As a specific example of this modification of our invention, but not for purposes of limitation, we give the following illustrative formula for our composition:

| | Parts (by weight) |
|---|---|
| Reaction product of rubber with an amphoteric metal halide (Pliolite) | 10 |
| Benzene, toluene or naptha | 90 |

It is, however, advantageous to add other ingredients to our composition. For example, the addition of waxes or waxy materials, halogenated fats or oils, or certain fatty acids, will materially decrease vapor transmission through the coating. Of course, it is to be understood that the reaction product of rubber with an amphoteric metal halide will itself materially decrease vapor transmission through the coated sheet and for many commercial purposes is sufficient even without the added ingredients. As specific examples of material suitable for this purpose, we mention, paraffin, petrolatum, ceresin, bees wax, hydrogenated cotton seed oil, hydrogenated lard and stearic acid.

While the coating composition of our invention will adhere to the surface of ordinary cellulose or protein sheet material in an entirely satisfactory manner, greater adhesion to the surface may be obtained by the addition of any natural or artificial gum or resin such as dammar, elemi, spermaceti, cumarone, vinyl resin and chlorinated diphenyl. As specific examples of our composition when these materials are incorporated, we present the following formula:

| | Parts (by weight) |
|---|---|
| Pliolite | 10 |
| Chlorinated diphenyl | 2½ |
| Naphtha | 87½ |

This formula gives a particularly adherent coating. We attribute this greater adherence to the chlorinated diphenyl. The reduced vapor transmission exhibited by coatings made with this formula is definitely increased by the pliolite. An additional formula showing another modification of our invention is as follows:

| | Parts (by weight) |
|---|---|
| Reaction product of rubber with an amphoteric metal halide (Pliolite or Plioform) | 10 |
| Paraffin | 2 |
| Cumarone | 2 |
| Naphtha | 43 |
| Benzene | 43 |

The cumarone mentioned in the above formula may be omitted if desired, but if used it materially increases the adherence of the coating to the base material.

Another modification of this invention is shown by the following formula:

| | Parts (by weight) |
|---|---|
| Pliolite | 5 |
| Dammar | 7.5 |
| Petrolatum | 1 |
| Benzene | 66.5 |

Plasticizers may be added to any or all of the above representative formulae if desired.

The application of the coating solutions of this invention to the sheet material and the preparation of these coating solutions may be carried out as follows:

The various ingredients of the composition are dissolved in the organic solvent selected. This selection, of course, will depend on the particular coating equipment and drying facilities available as pointed out above. All of the ingredients disclosed will dissolve in the solvents listed and many other volatile inert organic solvents or mixture of solvents which will dissolve these materials are also satisfactory. We do not limit ourselves to the particular solvents used since obviously any skilled chemist can select numerous solvents and combinations of solvents which will be operative in our process.

After the various ingredients have been dissolved and the solvents selected, the solution may be coated onto the sheet material on any machine ordinarily used for coating such material.

While we have suggested specific percentages of the reaction products of rubber with an amphoteric metal halide in the above illustrated formulas, it will be understood that the concentration of these products in the solvents can be varied through a wide range depending upon the adjustment of the coating machine and the type of coating desired. For example, if, for the particular purpose, the waterproofing and moisture proofing qualities of the composition are not required but it is only necessary to provide the sheet material with a superior sheen or finish provided by our coating material, a very superficial coating will suffice. As little as 1% of the reaction products of rubber with amphoteric metal halides may be employed under these circumstances. However, if a very substantial coating is required, as much as 20% of this material may be used. The upper limit is determined by the ability of the coating machine to handle the resulting viscous solution. The thickness of the coating is not determined entirely by the concentration of the solution. The adjustment of the doctor blades on the coating machine also influences this thickness so that it is possible, by setting the doctor blades to apply but a slight pressure and use a thin solution to produce a coating of the same thickness as would result from applying more pressure and using a thick solution.

One of the special advantages of our invention is that a large amount of paraffin may be added to the formula without detrimentally affecting the finished coating in any way. We find that we may use as much as 20% or even more of paraffin by weight based on the amount of reaction product of rubber with an amphoteric metal halide that is present. It has not been possible heretofore to use such a large percentage of waxy materials satisfactorily with other coating materials. Since suitable waxy materials may be obtained very cheaply, the large amounts which we are able to use in our composition decreases the cost of the resulting coating.

The non-blocking property of sheets coated with the coating compositions of this invention is a very advantageous feature of our invention. When sheets coated with our composition are piled up together they do not stick or adhere under any ordinary climatic conditions as has been the case with other coating materials used for this purpose. This is due to the comparative lack of tackiness and inability to soften under ordinary climatic temperatures and moisture conditions. However, as the temperature is increased materially the product will become sufficiently plastic to be heat-sealing. This is a great advantage over materials previously suggested for this purpose. The heat-sealing property is not exhibited at temperatures to which the material would commonly be subjected in storage or use.

An additional very desirable property of the products of this invention is their peculiar and pleasing sheen exhibited on the coated sheets.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. As a new article of manufacture, a flexible, transparent, moisture proof sheet comprising a base formed of a sheet of non-fibrous, transparent, cellulosic material coated with a moisture proofing composition containing a wax and a thermoplastic, resin-like rubber derivative of the "Plioform" type.

2. As a new article of manufacture a flexible, transparent, moisture proof sheet comprising a base formed of a sheet of non-fibrous, transparent, cellulosic material coated with a moisture proofing composition containing a wax, a plasticizer, a resin and a thermoplastic, resin-like rubber derivative of the "Plioform" type.

3. Flexible transparent wrapping material comprising a flexible backing having an adherent moisture proof coating comprising wax and rubber resin (Pliolite) in sufficient quantity to render the material heat sealing and waterproof.

4. A thin flexible sheet material coated with a moisture resistant, adherent and heat sealing composition which is non-tacky at ordinary temperatures comprising a major proportion of a rubber resin (Pliolite), and a minor proportion of a substance from the group consisting of cumarone, chlorinated diphenyl, vinyl resin and dammar.

5. A thin flexible sheet material coated with a composition containing a major proportion of a rubber resin (Pliolite) and a minor proportion of chlorinated diphenyl, said coated sheet being water and moisture proof.

6. A process for producing a moisture proof and heat sealable sheet material which comprises coating a flexible sheet with an organic solvent solution of a chlorinated diphenyl and a rubber resin (Pliolite), and evaporating said solvent from the coating.

7. Flexible transparent wrapping material comprising a flexible transparent backing having an adherent, moistureproof coating comprising wax and a condensation derivative of rubber in sufficient quantity to render the material heat-sealing and waterproof, said rubber condensation derivative being of a type which is thermoplastic, resin-like, soluble in naphtha, and of less chemical unsaturation than rubber.

8. As a new article of manufacture a flexible, transparent moistureproof sheet comprising a base coated with a moistureproofing composition containing a wax and a thermoplastic, resin-like rubber derivative of the "Plioform" type.

ERICH GEBAUER-FUELNEGG.
LOUIS K. EILERS.
EUGENE W. MOFFETT.